United States Patent [19]

Needham et al.

[11] 4,028,332

[45] June 7, 1977

[54] STABILIZATION OF CROSS-LINKED POLYOLEFINS

[75] Inventors: Donald G. Needham; Kenneth P. Taylor; Claude V. Brown, all of Bartlesville, Okla.

[73] Assignee: Phillips Petroleum Company, Bartlesville, Okla.

[22] Filed: Oct. 14, 1975

[21] Appl. No.: 621,895

[52] U.S. Cl. .................... 260/45.8 R; 252/400 A; 252/404; 252/406; 260/45.85 S; 260/45.95 C; 526/350; 526/352; 526/285; 526/228

[51] Int. Cl.$^2$ ................... C08K 5/14; C08K 5/36; C08K 5/52

[58] Field of Search ............... 260/45.8 R, 45.85 S, 260/45.95 C, 94.9 GA

[56] References Cited

UNITED STATES PATENTS

| | | | |
|---|---|---|---|
| 3,238,176 | 3/1966 | Brooks et al. | 260/45.8 |
| 3,238,178 | 3/1966 | Kibler et al. | 260/45.85 |
| 3,296,189 | 1/1967 | Eastman | 260/45.8 |
| 3,378,516 | 4/1968 | Tholstrup et al. | 260/45.8 |
| 3,454,523 | 7/1969 | Tholstrup | 260/45.8 |
| 3,573,251 | 3/1971 | Megna et al. | 260/45.8 |
| 3,763,095 | 10/1973 | Di Battista | 260/45.85 |
| 3,810,929 | 5/1974 | Song | 260/455 |
| 3,876,613 | 4/1975 | Needham et al. | 260/45.85 |
| 3,897,388 | 7/1975 | Lyons | 260/45.8 |

Primary Examiner—Melvyn I. Marquis
Assistant Examiner—R. A. White

[57] ABSTRACT

An improved stabilizer system for crosslinkable polyolefins consisting of a dialkyl pentaerythritol diphosphite and a sulfur-containing compound selected from the group consisting of the diester of thiodipropionic acid and a bis(3-hydroxy-4-alkyl-2,6-dimethylbenzyl) dithiolterephthalate, and an improved crosslinkable polyolefin composition comprising this stabilizer system.

9 Claims, No Drawings

STABILIZATION OF CROSS-LINKED POLYOLEFINS

This invention relates to polyolefin compositions.

The desirability of producing crosslinking in polymers which are polyolefin compositions, resides in the physical and chemical characteristics of the polymer whereby the solubility of the polymer in solvents is decreased, the thermoplasticity of the polymer suitably reduced and resistance of the polymer to deformation increased. By inducing such changes, the field of use of the polymer is broadened and the characteristics of products formed from the polymer are enhanced.

Polyolefin compositions can be crosslinked by the use of certain organic hydroperoxides or peroxides. The peroxide is incorporated into the polymer and the resulting mixture is heated, generally during molding, to effect crosslinking.

To stabilize the molded article to avoid a change of properties upon extended exposure to heat an antioxidant is generally incorporated into the composition prior to molding. For non-peroxide-crosslinked polymers many stabilizing antioxidants can be used. For peroxide-crosslinkable polymers the range of antioxidants is more limited. For these crosslinkable polymers the antioxidant must be compatible with the peroxide crosslinking compound. Moreover, it has been found that many peroxide-compatible antioxidants have an adverse effect on the low temperature impact strength of the crosslinked polymer composition.

It is known that the esters of thiodipropionic acids, e.g., dilaurylthiodipropionate (DLTDP), are peroxide-compatible and that good low temperature impact strength can be obtained by the use of these antioxidants. However, it has been found that a crosslinkable polymer stabilized with DLTDP suffers from two drawbacks: odor and discoloration. The odor develops during molding and is quite noticeable when the mold is opened after a molding cycle. Discoloration of the molded article is also noted. The physical properties of the crosslinked, molded product are excellent, so that the material has found wide acceptance, even with these drawbacks. It is desirable, however, that the crosslinked molded article be odor-free and color-stable.

It is an object of this invention to provide an improved stabilizer system for a crosslinkable polyolefin composition.

It is another object to provide an improved crosslinkable polyolefin composition.

Other objects, aspects and advantages of this invention will be readily apparent to those skilled in the art from the reading of the following disclosure.

In accordance with the present invention, it has been discovered that a crosslinkable polyolefin composition can be rendered relatively odor-free and color-stable by incorporating therein a stabilizer system consisting essentially of a dialkylpentaerythritol diphosphite and a sulfur-containing compound selected from the group consisting of a diester of thiodipropionic acid and a bis(3-hydroxy-4-alkyl-2,6-dimethylbenzyl) dithiolterephthalate. The composition, after crosslinking, is not only relatively odor-free and color-stable, but also has excellent physical properties.

More particularly, in accordance with the present invention there is provided a stabilizer system for polyolefins which consists essentially of:

A. A dialkylpentaerythritol diphosphite having the formula

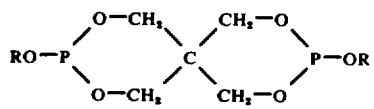

wherein R is an alkyl radical having from 12 to 20 carbon atoms,

B. a sulfur-containing compound selected from the group consisting of
1. a diester of thiodipropionic acid having the formula

wherein R' is an alkyl radical having 4 to 22 carbon atoms, and
2. a bis(3-hydroxy-4-alky-2,6-dimethylbenzyl) dithiolterephthalate having the formula

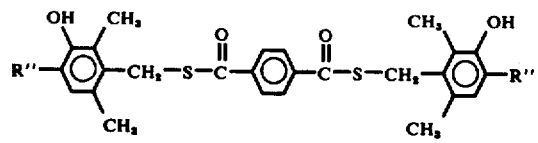

wherein R'' is a branched chain alkyl group having from 4 to 12 carbon atoms.

Examples of dialkyl pentaerythritol diphosphites suitable for use in the present invention include those compounds wherein the R group is dodecyl, tetradecyl, pentadecyl, hexadecyl, octadecyl and eicosyl.

Examples of diesters of thiodipropionic acid suitable for use in the present invention include those compounds wherein the R' group is butyl, isobutyl, t-butyl, amyl, isoamyl, n-octyl, isooctyl, 2-ethyl hexyl, t-octyl, decyl, dodecyl, octadecyl, eicosyl and docosyl. The R' groups can be the same or different. Preferably, at least one of the R' groups has at least 10 carbon atoms.

A presently preferred group of esters of thiodipropionic acid are those in which both R' radicals have 12′20 carbon atoms, more preferably esters in which both R' groups are the same, including the didodecyl, dioctadecyl and ditetradecyl esters.

Examples of the bis(3-hydroxy-4-alkyl-2,6-dimethylbenzyl)dithiolterephthalates suitable for use in the present invention include those compounds wherein the R'' group is t-butyl, isobutyl, dimethyl propyl, t-octyl, 2,2-diethylhexyl, 2,2,4,4-tetramethyl octyl and the like.

The stabilizer system of this invention contains the pentaerythritol derivative (A) and the sulfur-containing compound (B) in a weight ratio of A:B in the approximate range of 3:1 to 1:3, preferably about 1:1.

In a presently preferred embodiment of this invention, the sulfur-containing component (B) of the stabilizer system is a bis(3-hydroxy-4-alkyl-2,6-dimethyl benzyl) dithiolterephthalate, as described above.

Further, in accordance with the present invention, there is provided a composition comprising a solid homopolymer or copolymer of a mono-1-olefin, a peroxy crosslinking compound and the stabilizer system described above.

The crosslinkable polyolefins which form the basis for these compositions are homopolymers or copolymers of mono-1-olefins having from 2 to 8 carbon atoms, and mixtures thereof. Polymers of ethylene, propylene, butene-1, hexene-1, octene-1, and the like as well as copolymers of two mono-1-olefins, such as ethylene and propylene, ethylene and butene-1, ethylene and hexene-1, and the like, can be used.

The presently preferred polymers include ethylene homopolymers and copolymers of ethylene and at least one acrylic mono-1-olefin having from 3 to 8 carbon atoms per molecule and mixtures thereof. These copolymers are usually formed from 75 to 99 weight percent ethylene.

Preferably the polymers of ethylene used in the invention have a melt index of at least about 10, a density in the range of 0.920–0.970, preferably 0.940–0.970, and a molecular weight distribution not greater than about 7. Polymers having a melt index in the range of 10–200 give excellent results. Many useful compositions have a melt index in the range of 10–50. The polymers can be produced by any suitable method such as by the method of U.S. Pat. No. 2,825,721 of Hogan et al, issued March 4, 1958. The desired melt index can be obtained by physical working which subjects the polymer to high shearing forces, such as by subjecting the material to working at elevated temperature in an extruder.

The crosslinking compounds which are suitable for use in the present invention are organic peroxides. Peroxides useful for promoting crosslinking include some organic mono- and diperoxides having one or more tertiary carbon atoms attached to the peroxide linkage. Monoperoxides which can be used are dicumyl peroxide, di-tert-butyl peroxide and other tertiary monoperoxide and other tertiary monoperoxide; diperoxides which can be used are bis(tert-alkylperoxy)-alkanes, such as 2,5-bis(tert-amylperoxy)-2,5-dimethyl-hexane, 2,5-bis(tert-butylperoxy)-2,5-dimethylhexane and 8,11-bis(tert-butylperoxy)-8,11-dimethyl octa-decane.

Presently preferred, however, are the acetylenic diperoxy compounds of the formula

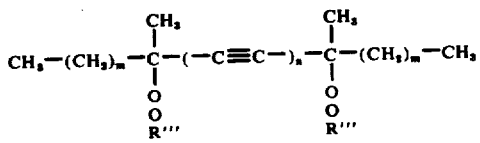

wherein n is an integer having a value of 1 or 2, m is an integer having a value of 0 or 1, and the sum of $n + m$ is 1 or 2, and wherein R''' is selected from the group consisting of tertiary alkyl having 4 to 8 carbon atoms, alkyl carbonate having 2 to 6 carbon atoms, haloalkyl carbonate having 2 to 6 carbon atoms, benzoate and lower alkyl-substituted benzoate.

These acetylenic diperoxy compounds include hexynes having the formula

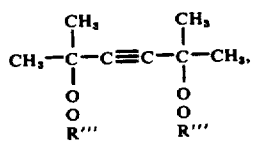

octynes having the formula

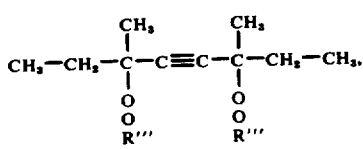

and octynes having the formula

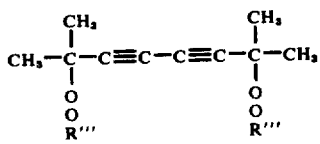

wherein R''' is as described above. In general, the molecular weights of the poly peroxides fall within the range of 230 to 550. Excellent results are achieved with the above-noted hexynes.

Examples of the above-described hexynes, octynes and octadiynes include:

2,7-Dimethyl,7-di(t-butylperoxy)octadiyne-3,5
2,7-Dimethyl-2,7-di(peroxy ethyl carbonate)octadiyne-3,5
3,6-Dimethyl-3,6-di(peroxy ethyl carbonate)octyne-4
3,6-Dimethyl-3,6-di(t-butylperoxy)octyne-4
2,5-Dimethyl-2,5-di(peroxybenzoate)hexyne-3
2,5-Dimethyl-2,5-di(peroxy-n-propyl carbonate)hexyne-3
2,5-Dimethyl-2,5-di(peroxy isobutyl carbonate)hexyne-3
2,5-Dimethyl-2,5-di(peroxy ethyl carbonate)hexyne-3
2,5-Dimethyl-2,5-di-(alpha-cumyl peroxy)hexyne-3
2,5-Dimethyl-2,5-di(peroxy beta-chloroethyl carbonate)hexane-3
2,5-Dimethyl-2,5-di(t-butylperoxy)hexyne-3.

The peroxy crosslinking compound is employed in the composition of this invention in a crosslinking amount, i.e., an amount which will bring about the desired degree of crosslinking. In general, the amount of crosslinking compound will be in the approximate range of 0.1 to 10 weight percent, based upon the weight of polymer.

To stabilize the molded article to avoid a change of properties upon extended exposure to heat the stabilizer system described above is incorporated into the composition prior to molding. The stabilizer system can be employed in a total amount ranging from about 0.01 to 0.1 weight percent, based upon the weight of polymer. A greater amount of the stabilizer system can be employed, however, such greater amount tends to interfere with the crosslinking reaction. In a presently preferred embodiment the stabilizer system is employed in a total amount in the range of 0.03 to 0.06 weight percent, more preferably about 0.04 weight percent.

The compositions of this invention are prepared by admixing the olefin homopolymer or copolymer, the crosslinking compound and the stabilizer system using conventional techniques employed in the polymer field, such as by passage through mixing rolls or dispersion using conventional type mixers.

Such admixture of the crosslinking compound, the polymer and the stabilizing system can be performed at about room temperature or at a temperature different from room temperature but below that at which crosslinking is effected. After uniform distribution of the crosslinking compound and the stabilizing system in the polymer, the admixture can be formed and shaped by conventional procedures.

As used herein the following properties are measured according to the test described by the American Society of Testing Materials under the designation listed below and are in the units indicated:

Melt Index (M. I.) ASTMD-1238-62T, Condition E, grams/10 min.

Density ASTM D-1505-63T, grams/cc.

Molecular weight distribution ($M_w/M_n$) is indicated by the ratio of the weight average molecular weight, $M_w$, to the number average molecular weight, $M_n$. A high value for this ratio is indicative of a broad molecular weight distribution. Both weight-average and number-average molecular weight are determined by gel permeation chromatography (GPC) as described by J. C. Moore, J. Polymer Science, Part A, Vol. 2, pp. 835–843 (1964). Calibration of the GPC method was by membrane osmometry ($M_n$) and light scattering ($M_w$).

Impact strength is measured in foot pounds and is determined by a dart impact test. A flat sample 5 inches square and 0.125 inch thick is placed on a flat support having a 3.5-inch diameter circular opening. A metal dart having a hemispherical contact point machined on a ½-inch radius (1 inch diameter) is dropped onto the center of the sample from various heights until a height is reached at which the sample fails. The measured value is determined by multiplying the weight of the dart in pounds by the largest value of the height in feet from which the dart can be dropped without failure. For values of impact strength equal to or greater than 40 foot pounds a 10-pound dart is used. For lower values a 5-pound dart is used.

The following example illustrates the invention.

EXAMPLE

Runs were made with a homopolymer of ethylene having a density of 0.965 and a melt index of 30, having incorporated therein 0.75 weight percent of the crosslinking agent 2,5-dimethyl-2,5-di(t-butylperoxy)hexyne-3 and various stabilizers. The polymer, crosslinking compound and stabilizers were dry blended by tumble blending. The resulting dry blend was repelletized. The pellets were ground to pass a 35-mesh screen (U.S. Standard Sieve Series). In such run the article molded was a generally rectangular container 8 inches by 24 inches by 30 inches having a wall thickness of 0.125 inch. Test panels 5 inches square were cut from these molded containers for the impact strength tests.

The results of the runs are presented in the following table. The impact strength of the molded samples was measured as previously described at −80° F (−62° C). The color of the molded article was judged visually and rated on a scale ranging from "Excellent" to "Poor". A color rating of "Excellent" means that the molded article was nearly white; a color rating of "Poor" means that the color of the molded article was brown. The odor of the molded article was rated on a scale of 1 to 5, with a rating of 1 being nearly odorfree and a rating of 5 being a strong, disagreeable odor.

Runs 1–6, in the table below, are comparison runs using known antioxidants for polyethylene. Inventive runs 7 and 8 employ the stabilizer system of this invention.

Table

Properties of Crosslinked Polyethylene Containing Various Stabilizers

| Run | Stabilizer | Amount, Weight % | Color Rating | Odor Rating | Impact Strength, ft.-lbs. at −80° F |
|---|---|---|---|---|---|
| 1 | Ethyl 330[1] | 0.04 | — | good | 5 |
| 2 | Succonox 12[2] | 0.04 | — | good | 5 |
| 3 | Agerite White[3] | 0.04 | — | poor | not measured |
| 4 | DLTDP[4] | 0.04 | poor | 4 | 60 |
| 5 | DOPDP[5] | 0.02 | excellent | 5 | 10 |
| 6 | BHDT[6] | 0.02 | good | 2 | 55 |
| 7 | DOPDP DLTDP | 0.02 0.02 | good | 3 | 55 |
| 8 | DOPDP BHDT | 0.02 0.02 | excellent | 1 | 65 |

[1]1,3,5-Trimethyl tris(3,5-di-t-butyl-4-hydroxybenzyl) benzene, Ethyl Corporation, Baton Rouge, La.
[2]N-lauroyl-p-aminophenol, Miles Laboratories, Elkdart, Ind.
[3]Di-beta-naphthol-p-phenylenediamine, R. T. Vanderbuilt Co., N.Y., N.Y.
[4]Dilaurylthiodipropionate.
[5]Dioctadecyl pentaerythritol diphosphite.
[6]Bis(3-hydroxy-4-t-butyl-2,6-dimethylbenzyl) dithiolterephthalate.

The above data illustrate that the best combination of properties, i.e., low odor, good color and high impact strength at low temperature were obtained using the stabilizer system of run 8. This was unexpected since the molded article containing the DOPDP alone had an odor rating of 5 and an impact strength of only 10 ft-lbs. It would have been expected that the article containing the combination of DOPDP and BHDT would have a greater odor rating and a lower impact strength than the article containing the BHDT alone.

The stabilizer system of DLTDP and DOPDP employed in run 7 also provided unexpected results. Based on the results of run 5 it would have been expected that the article of run 7 would have both a higher odor rating and a lower impact strength than the values actually observed.

The data of runs 1–3 illustrate the rather poor combinations of properties obtained by the use of other known stabilizers.

Reasonable variations and modifications, which will be apparent to those skilled in the art, can be made in this invention without departing from the spirit and scope thereof.

What is claimed is:
1. A composition of matter comprising
   I. a solid polymer selected from the group consisting of ethylene homopolmers and copolymers of ethylene and at least one acyclic mono-1-olefin having from 3 to 8 carbon atoms per molecule, and mixtures thereof, wherein said copolymers contain from 75 to 99 weight percent of said ethylene;
   II. a crosslinking amount of an acetylenic diperoxy compound of the formula

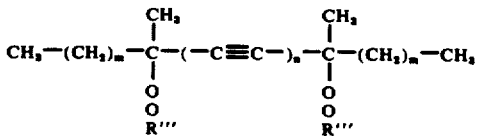

wherein $n$ is an integer having a value of 1 or 2, $m$ is an integer having a value of 0 or 1, and the sum of $n + m$ is 1 or 2, and R''' is selected from the group consisting of tertiary alkyl having 4 to 8 carbon atoms, alkyl carbonate having 2 to 6 carbon atoms, haloalkyl carbonate having 2 to 6 carbon atoms, benzoate and lower alkyl-substituted benzoate; and III. a stabilizing amount of a stabilizer system consisting essentially of
A. a dialkylpentaerythritol diphosphite having the formula

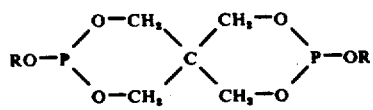

wherein R is an alkyl radical having from 12 to 20 carbon atoms, and

B. a sulfur-containing compound selected from the group consisting of
1. a diester of thiodipropionic acid having the formula

S(CH₂CH₂COOR')₂ wherein R' is an alkyl radical having 4 to 22 carbon atoms; and 2. a bis(3-hydroxy-4-alkyl-2,6-dimethylbenzyl) dithiolterephthalate of the formula

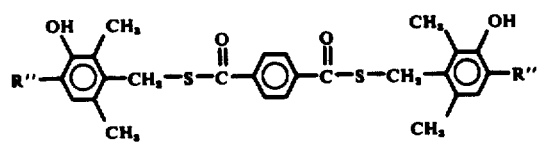

wherein R'' is a branched chain alkyl group having from 4 to 12 carbon atoms, wherein the weight ratio of compound (A) to compound (B) is in the approximate range of 3:1 to 1:3.

2. The composition of claim 1 wherein the amount of said acetylenic diperoxy compound is in the approximate range of 0.1 to 10 weight percent.

3. The composition of claim 1 wherein the total amount of said compound (III-A) and said compound (III-B) is in the approximate range of 0.01 to 0.1 weight percent.

4. The composition of claim 1 wherein the weight ratio of said compound (III-A) to said compound (III-B) is about 1:1.

5. The composition of claim 1 wherein said compound (III-A) is octadecylpentaerythritol diphosphite and said compound (III-B) is dilaurylthiodipropionate.

6. The composition of claim 1 wherein said compound (III-A) is octadecylpentaerythritol diphosphite and said compound (III-B) is bis(4-t-butyl-3-hydroxy-2,6-dimethylbenzyl) dithiolterephthalate.

7. A stabilizer system for crosslinkable polyethylene which consists essentially of
A. a dialkylpentaerythritol diphosphite having the formula

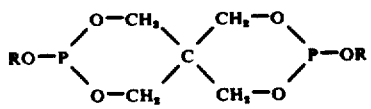

wherein R is an alkyl radical having from 12 to 20 carbon atoms, and

B. a bis(3-hydroxy-4-alkyl-2,6-dimethylbenzyl) dithiolterephthalate having the formula

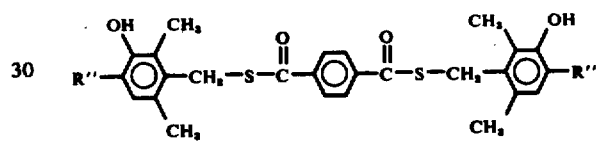

wherein R'' is a branched chain alkyl group having from 4 to 12 carbon atoms, wherein the weight ratio of compound (A) to compound (B) is in the approximate range of 3:1 to 1:3.

8. The system of claim 7 wherein the weight ratio of compound (A) to compound (B) is about 1:1.

9. The system of claim 7 wherein said compound (A) is octadecylpentaerythritol diphosphite and said compound (B) is bis(4-t-butyl-3-hydroxy-2,6-dimethylbenzyl) dithiolterephthalate.

* * * * *